(12) United States Patent
Jayaram et al.

(10) Patent No.: US 9,900,626 B2
(45) Date of Patent: Feb. 20, 2018

(54) SYSTEM AND METHOD FOR DISTRIBUTING MULTIMEDIA EVENTS FROM A CLIENT

(71) Applicant: Intel Corporation, Santa Clara, CA (US)

(72) Inventors: Sankar Jayaram, Santa Clara, CA (US); Ritesh Kale, Cupertino, CA (US); John Harrison, Santa Clara, CA (US); Charles DeChenne, Pullman, WA (US); Uma Jayaram, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/338,239

(22) Filed: Oct. 28, 2016

(65) Prior Publication Data

US 2017/0127096 A1  May 4, 2017

Related U.S. Application Data

(60) Provisional application No. 62/247,675, filed on Oct. 28, 2015.

(51) Int. Cl.
*H04N 7/18* (2006.01)
*H04N 21/234* (2011.01)
(Continued)

(52) U.S. Cl.
CPC ... *H04N 21/23412* (2013.01); *H04L 65/4076* (2013.01); *H04L 65/4084* (2013.01); *H04L 65/4092* (2013.01); *H04L 65/605* (2013.01); *H04L 65/608* (2013.01); *H04L 67/02* (2013.01); *H04N 5/23238* (2013.01);
(Continued)

(58) Field of Classification Search
CPC ......... H04N 21/23412; H04N 5/23238; H04N 21/2343; H04N 21/2668; H04N 21/4334; H04N 21/436; H04N 21/6125; H04N 21/6175; H04N 21/816; H04N 21/4302; H04N 21/6405; H04L 65/4076;
(Continued)

(56) References Cited

U.S. PATENT DOCUMENTS

2005/0079856 A1\* 4/2005 Lilge ..................... G06Q 20/04
455/406
2006/0002391 A1\* 1/2006 Takihiro .................. H04L 45/00
370/390
(Continued)

FOREIGN PATENT DOCUMENTS

WO  WO-2014/165326 A1  10/2014

OTHER PUBLICATIONS

PCT/US2016/059585 Search Report, dated Feb. 6, 2017, Voke, Inc.
PCT/US2016/059585 Written Opinion, dated Feb. 6, 2017, Voke, Inc.

*Primary Examiner* — Oleg Asanbayev
(74) *Attorney, Agent, or Firm* — Nicholson De Vos Webster & Elliott LLP

(57) ABSTRACT

A system and method are provided for recording a video production from one or more panoramic and/or high resolution video feeds and recreating the video production at a remote location, or client using meta data, production data, and video feed from a remote source, and serve the video feed to multiple clients on a local area network.

20 Claims, 2 Drawing Sheets

(51) Int. Cl.
*H04L 29/06* (2006.01)
*H04L 29/08* (2006.01)
*H04N 5/232* (2006.01)
*H04N 21/2343* (2011.01)
*H04N 21/2668* (2011.01)
*H04N 21/433* (2011.01)
*H04N 21/436* (2011.01)
*H04N 21/61* (2011.01)
*H04N 21/81* (2011.01)
*H04N 21/43* (2011.01)
*H04N 21/6405* (2011.01)

(52) U.S. Cl.
CPC ..... *H04N 21/2343* (2013.01); *H04N 21/2668* (2013.01); *H04N 21/436* (2013.01); *H04N 21/4334* (2013.01); *H04N 21/6125* (2013.01); *H04N 21/6175* (2013.01); *H04N 21/816* (2013.01); *H04N 21/4302* (2013.01); *H04N 21/6405* (2013.01)

(58) Field of Classification Search
CPC ............. H04L 65/4084; H04L 65/4092; H04L 65/605; H04L 65/608; H04L 67/02
See application file for complete search history.

(56) References Cited

U.S. PATENT DOCUMENTS

| | | |
|---|---|---|
| 2007/0217400 A1 | 9/2007 | Staples |
| 2011/0283310 A1 | 11/2011 | Davis et al. |
| 2012/0174005 A1 | 7/2012 | Deutsch et al. |
| 2014/0380387 A1 | 12/2014 | Pattan et al. |
| 2015/0215497 A1* | 7/2015 | Zhang ................ H04N 21/4307 348/521 |
| 2016/0029138 A1 | 1/2016 | France et al. |
| 2016/0029140 A1 | 1/2016 | Mehta et al. |
| 2016/0064003 A1 | 3/2016 | Mehta et al. |
| 2017/0111711 A1* | 4/2017 | Deuel ................ H04N 21/8358 |
| 2017/0180800 A1* | 6/2017 | Mayrand .......... H04N 21/44218 |

\* cited by examiner

SYSTEM AND METHOD FOR DISTRIBUTING MULTIMEDIA EVENTS FROM A CLIENT

RELATED PATENT DATA

This patent resulted from U.S. Provisional Patent Application Ser. No. 62/247,675, which was filed Oct. 28, 2015, and which is hereby incorporated herein by reference.

TECHNICAL FIELD

This disclosure pertains to systems and methods for recording a video production, distributing the video production, and viewing the video production at a remote location. More particularly, this disclosure relates to recording of a video production by recording meta data related to one or more panoramic or large field-of-view video feeds and distributing and serving the video production through a content distribution network to a client where viewers can tailor the received video stream at a client into unique, individualized video productions at multiple clients on a local network.

BACKGROUND

Techniques are known for capturing, recording, and delivering video. Most techniques involve a video capture system that captures video and generates a video stream (or feed) from a video camera that is delivered over a network to multiple users. Viewers are limited by receiving the same video stream at each client which limits what they can see based on the camera orientation, location, and zoom realized by the video camera operator(s) who generate the video stream. Improvements are needed to enable viewers to tailor a received video stream at a client into unique, individualized video productions at multiple clients on a local network.

SUMMARY OF THE INVENTION

An apparatus and method are provided for recording a video production from one or more panoramic and/or high resolution video feeds and recreating the video production at a remote location, or client using meta data, production data, and video feed from a remote source, and serve the video feed to multiple clients on a local area network.

According to one aspect, an apparatus is provided for acquiring and distributing streaming immersive environment content to a client over a content distribution network based environment. The apparatus includes a content distribution network, a primary client, secondary clients, and a local area network. The content distribution network has a server configured to distribute a stream of immersive environment content from a digital broadcast; The primary client communicates with the network via a communications link and is configured to receive the stream of immersive environment content from the digital broadcast. The secondary clients communicate with the network via a communications link each configured to download at least a portion of the immersive environment content such that a first secondary client is receiving a first rendering of the immersive environment content from the stream of the immersive environment content that is unique from a second rendering of the immersive environment content being received by a second secondary client. The local area network is interfaced between the primary client and the secondary clients. The secondary clients are each rendered capable to display a unique set or subset of the full representation of the stream of immersive environment content from the primary client.

According to another aspect, an apparatus is provided for acquiring and distributing streaming immersive environment content to clients over a network. The apparatus includes a content distribution network, a hub client, spoke clients, and a local area network. The content distribution network has a server configured to distribute a digital broadcast of an immersive environment as a stream of immersive environment content. The hub client communicates with the network via a communications link and is configured to receive the stream of immersive environment content as a full representation of the digital broadcast. The spoke clients communicate with the network via a communications link, each configured to receive at least a portion of the stream of immersive environment content, wherein a first spoke client is receiving at least a portion of the stream of immersive environment content that is unique from at least a portion of the stream of immersive environment content being received by a second spoke client. The local area network is interfaced between the hub client and the node client. The node clients are each rendered capable of displaying a unique portion of the stream of immersive environment content from the primary client.

According to yet another aspect, a method is provided for dispersing immersive environment content to clients. The method includes: providing a content distribution network having a server, a central client, a plurality of peripheral clients, and a local area network; distributing a digital broadcast of an immersive environment as a stream of immersive environment content to the central client; from the peripheral clients, downloading at least a portion of the stream of immersive environment content such that a first peripheral client is receiving a first at least a portion of the stream of immersive environment content that is unique from a second at least a portion of the stream of immersive environment content being received by a second peripheral client from the stream; rendering for display at the first peripheral client the first at least a portion of the stream from the central client; and rendering for display at the second peripheral client the second at least a portion of the stream from the central client that is unique from the first at least a portion of the stream being rendered for display at the first peripheral client

BRIEF DESCRIPTION OF THE DRAWINGS

Preferred embodiments of the disclosure are described below with reference to the following accompanying drawings.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Embodiments disclose an apparatus and method for receiving a video stream or feed from a plurality of Panoramic Video Camera Heads or from a local storage disk and receiving the video feed and serving the video feed to multiple clients via a local network from a client system. Individual users at the multiple clients can then manipulate the video to generate personal videos that can be shared through the Internet and social media, and viewing the generated personal videos. An apparatus and method are provided for distributing or serving the video stream to a client for distribution to multiple clients on a local network, thereby reducing bandwidth requirements.

For the case of image inputs, stereoscopic pairs of video cameras are provided in an array. A combined unit of monoscopic or stereoscopic video detectors with processing circuitry to create panoramic image data for panoramic videos is referred to as a Panoramic Video Camera Head. The video data from a Panoramic Video Camera Head can be streamed to a viewer or recorded in computer memory or storage and retrieved by a viewer and viewed using user interface devices for control.

Various embodiments described herein are described with reference to figures. However, certain embodiments may be practiced without one or more of these specific details, or in combination with other known methods and configurations. In the following description, numerous specific details are set forth, such as specific configurations and methods, etc., in order to provide a thorough understanding of the present invention. In other instances, well-known construction techniques and methods have not been described in particular detail in order to not unnecessarily obscure the present invention. Reference throughout this specification to "one embodiment" or "an embodiment" means that a particular feature, configuration, composition, or characteristic described in connection with the embodiment is included in at least one embodiment of the invention. Thus, the appearances of the phrase "in one embodiment" or "an embodiment" in various places throughout this specification are not necessarily referring to the same embodiment of the invention. Furthermore, the particular features, configurations, compositions, or characteristics may be combined in any suitable manner in one or more embodiments.

Figure 1:
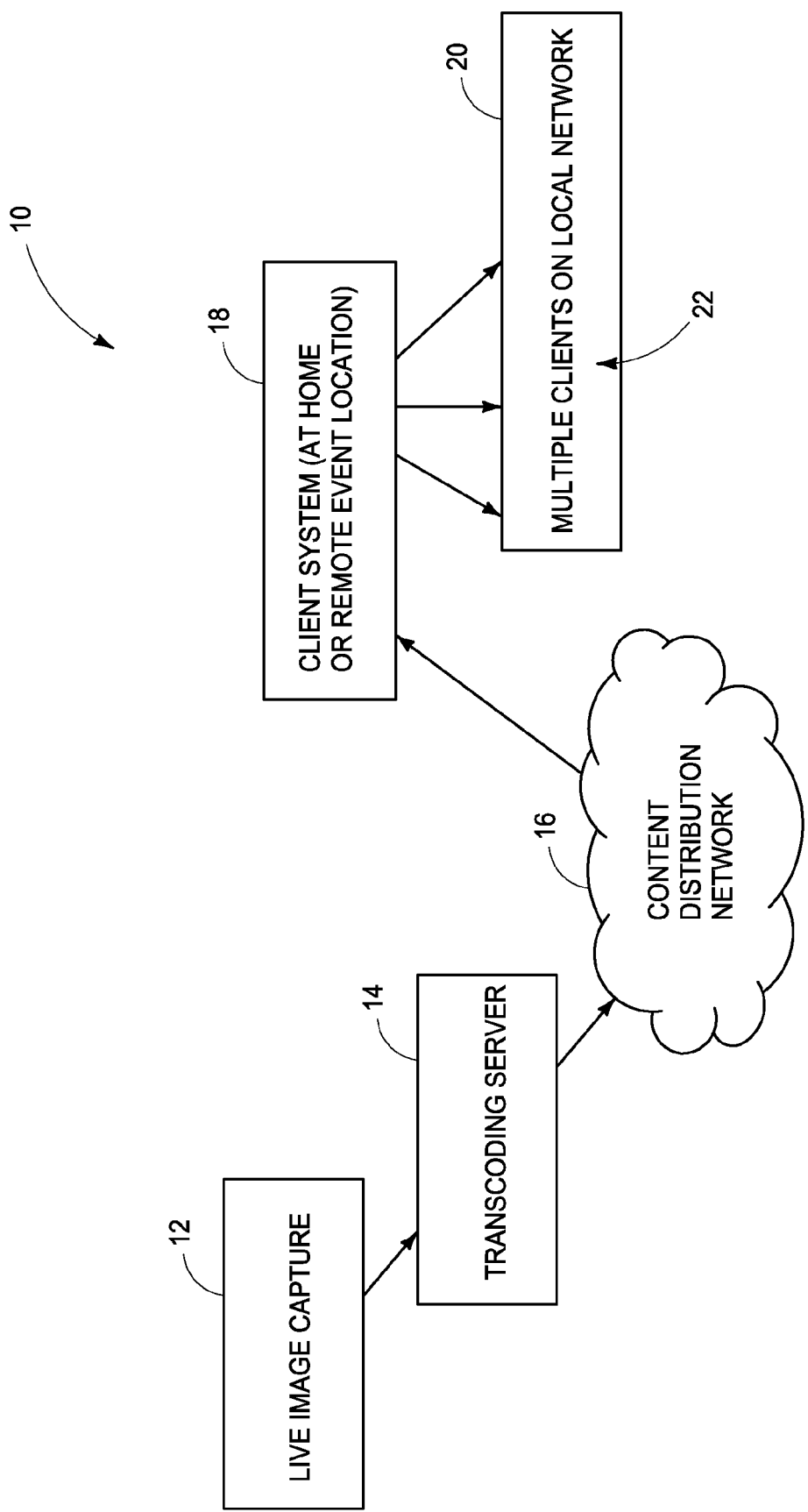
FIG. 1 is a schematic diagram showing an apparatus and method for recording a video production from one or more panoramic and/or high resolution video feeds, distributing the video content through a content distribution network to a client, and serving the video feed to multiple clients locally.

FIG. 1 provides an apparatus 10 and a method for recording a video production from one or more panoramic and/or high resolution video feeds, or image capture devices (or cameras) 12 and recreating the video production at a remote location using meta data, production data, and video feed from a remote source, where a content distribution network 16 receives the video feed from a transcoding server 14 and serves the video to a client system 18 (at a home or a remote event location) and for concurrent use by multiple clients 22 over a local network 20. A recording device, such as a camera or an array of cameras 12 (or stereoscopic camera pairs), captures one or more image objects in a scene being captured by the recording device. One or more recording devices capture video/media about the object and send it to one or more server 14. A video stream/video clip/media entity is generated by the camera(s) 12.

Figure 2:
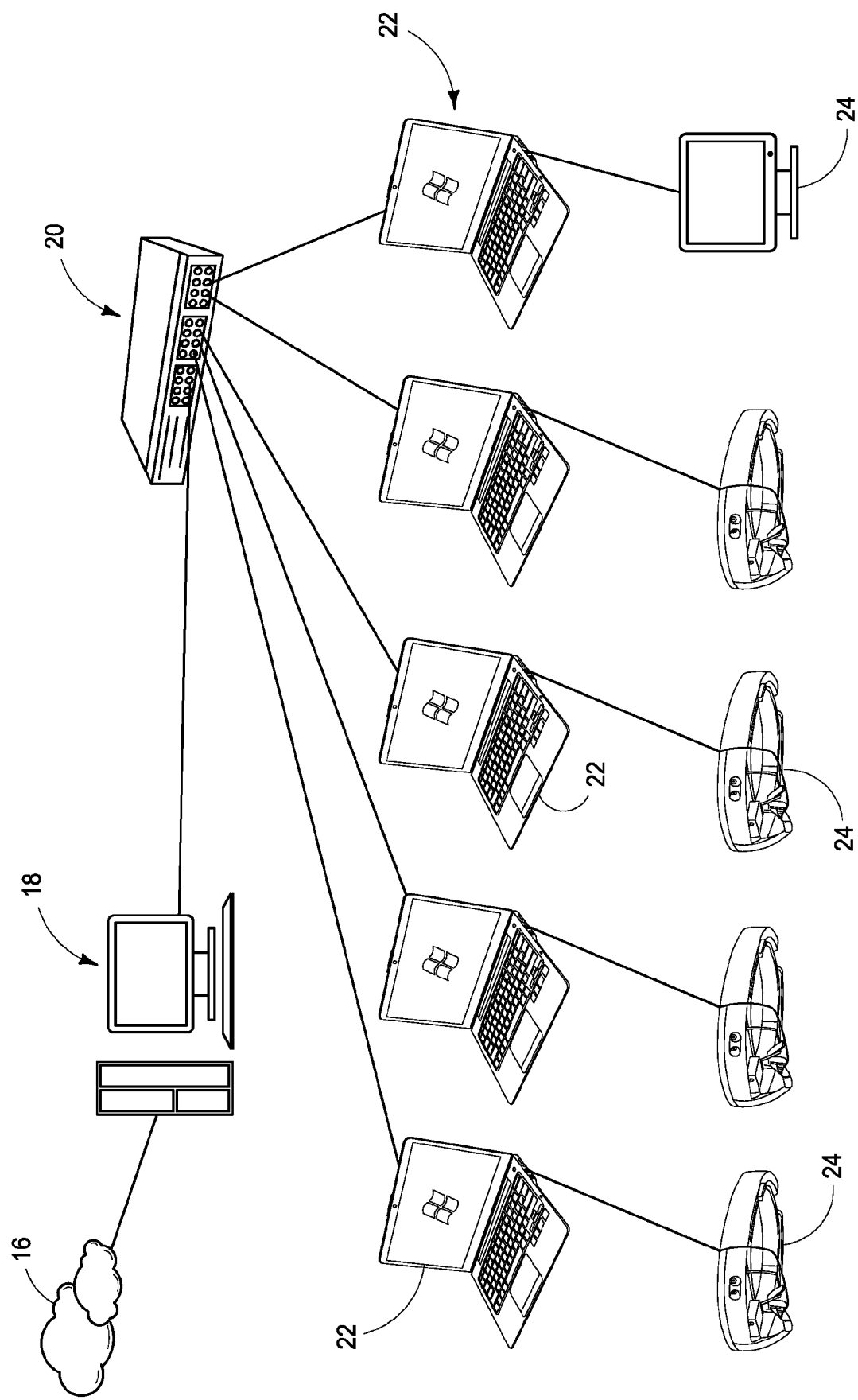
FIG. 2 is a schematic diagram showing implementation of the apparatus and method of FIG. 1 on a distributed network, including a client system having a local area network with a plurality of clients.

As shown in FIG. 2, content distribution network 16 delivers a video stream to a client system 18 (server or computer) for local distribution within an environment, such as a hospital, a school, or a home. A local area network switch 20 delivers the video stream to multiple clients 22, such as individual computers, laptop computers, tablet computers, or phones. Personal virtual reality (VR) goggles 24 or local computer display 26. Client 18 can be referred to as a primary, hub, or central client and clients 22 can be referred to as secondary, spoke, or peripheral clients.

While at any one of the multiple clients on the local area network, each person (or user) receives a video stream that they can individually manipulate (a virtual reality stream). A single stream is sent to the client system location, which saves bandwidth. Each user can use the stream to realize their own personalized experience at an end user device, such as through virtual reality (VR) goggles 24 or a local computer 26 (including a user interface and display).

In an effort to show operation, the following test implementation was designed for testing. In this design, we are trying to deliver as a part of a live stream of immersive environment content that we are providing to a high school in India and a hospital in California from an NBA basketball game. We will have the live video captured at the event location. We will transcode the video so that it can be delivered over the Internet. We will use a Content Distribution Network to deliver the video to geographically diverse clients.

At the client location, we will have one system receive the live video feed and serve the data to multiple clients over a local network. This eliminates the need for multiple clients connecting individually to the CDN to receive the stream, hence reducing the bandwidth requirements at the client end.

At the capture location, the video is compressed using a video compression format (Example: H.264). At the capture location, spatial audio is compressed using an audio compression format (Example: AAC). The audio and video streams are packaged in a container. Any other auxiliary data that is related to the video and audio (for example: metadata, graphic overlays, etc.) can be packaged as a part of this container. The audio, video, and auxiliary data is time-stamped for synchronization during playback. The resultant container format is segmented into small chunks (5-15 second duration) so that these files can be easily transported over HTTP.

The content form the transcoding server is made available to the content distribution network using a web server (example: Apache, IIS). This content can now be accessed from any location and the content distribution network provides the geographical distribution capabilities. The content is currently being delivered over HTTP, but any other transport protocol could be used as long as the server and the client are able to communicate to each other over that transport protocol.

At the client end, one connection to the content distribution network is established and the content is downloaded. As the content is being downloaded on one client, the same client is copying the content to a local store that can be shared on a local network. Clients connecting to this local network don't need to establish any connections to the content distribution network and can consume the content on the local network from the one client that is downloading the content. Another mechanism of sharing the content over the local network is to initiate a stream (for example: RTP, RTSP, RTMP, etc.) from the client downloading the data and streaming the content to the other clients connected to the local network. This mechanism of streaming the content over the local network is especially useful in live streaming scenarios.

Significant reduction in internet bandwidth requirements can be realized as there is only one connection established between the client and the content distribution network. Even though there are multiple clients consuming the same content, only one client is using the bandwidth to acquire the content from the internet/content distribution network.

The VR stream contains video in a high definition panoramic format. At any given time, a typical consumer would be viewing only part of the panoramic video. This enables different consumers to be looking at different sections of the panoramic video. In VR environments, spatial audio enables the audio playback to personalized experience of each consumer. With a single stream of content being downloaded from the internet/content distribution network, different consumers on the local network can be immersed in the VR environment and each consumer could be looking and hearing different piece of the content based on their view in the VR space. This enables a very personalized experience to each consumer in the VR environment.

Example A

In a basketball game, one consumer is looking at the coach, while another consumer is looking at the play at the same point in time.

Example B

In a concert, one consumer is looking at the lead singer, while another consumer is looking at the drummer.

Specific description of client-side setup: The client computer 18 is receiving a live stream of a broadcast from the content distribution network 16. The stream is delivered as segmented media files and these files are downloaded to the client computer's hard drive. The client computer is also connected to a local area network switch 20 using another network interface on the client computer. Multiple client computers 22 are connected to the local area network switch. The client computers 22 are capable of displaying the content in a VR environment with the help of head mounted displays 24. Each of these client computers 22 would receive the stream from the main client computer 18 that is serving the content over the local area network 20 as an HTTP stream. In this mechanism, files are downloaded sequentially over HTTP and displayed to the consumer in the head-mounted-display.

Another mechanism for serving the content over the local area network is to use a real time streaming protocol like RTP/RTSP/RTMP. These real time streaming protocols coupled with multicasting capabilities over the local area network allow for many client computers 22 to subscribe to the stream from the main client computer 18 and the stream can be very closely synchronized between the client computers 18. This is especially desirable in live streaming scenarios.

A test configuration was designed in order to test the above-detailed apparatus and method. The test configuration was designed to display implementation capabilities for virtual reality (VR) National Basketball Association (NBA) game viewing to students at Dhirubai Ambani International School in Mumbai, India while the game was being played in the United States in California between the Sacramento Kings and the Clippers. A target audience consisted of 30-40 students at Dhirubai Ambani International School. The test objective was to provide for the first time a live streaming NBA game Virtual Reality experience for the fans in India. On Oct. 29, 2015 from 7:00 AM to 10:00 AM IST, students of Dhirubai Ambani International School will be witnessing the first home game of the Sacramento Kings against the Los Angeles Clippers for the season opener of the 2015-16 NBA Season.

The test configuration setup included 1 computer and 5 laptops connected to the switch via Ethernet cables. The computer will also be connected to the Internet via wired Ethernet connection so that it can download the live feed at highest possible download speeds (preferably a 40 Mbps connection for best experience). This computer will then be streaming out the live action to the five laptops through the common switch. Four laptops will be connected to Oculus Rift headsets. One laptop will be connected to the TV.

The audience will be able to view the live action either via virtual reality (VR) Oculus Rift headsets or on the television. We would like to provide 30-40 students with this experience, where they can be taking turns with the Oculus Rift headsets for 10 minutes at a time. The kids who are waiting for their turn at using the virtual reality (VR) headsets can continue to watch the game on the television or on a projector.

Test system requirements are as follows: a room or an auditorium with minimum capacity of 20 people; a wired Internet connection; four power outlets; one large-screen HDTV with an HDMI input; a preferred Internet download speed of 40 Mbps; and an uninterrupted power supply. Hardware will include five laptop computers; four Oculus Rift VR headsets; a computer system; a television with an HDMI input; a game controller; four headphones; ten Ethernet cables; one switch; and one HDMI cable. Software will include one version of Panoptes software; four copies of Panoptes with Oculus and Overlay support; and one copy of Jackalope.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

We claim:
1. A system, comprising:
a content distribution network having a server configured to distribute a stream of immersive environment content from a digital broadcast;
a virtual reality (VR) client communicating with the network via a communications link and configured to receive for distribution the stream from the digital broadcast;
local area clients communicating with the network via a communications link each configured to download at least a portion of the immersive environment content distributed from the VR client such that a first local area client is receiving a first rendering of the immersive environment content from the stream that is unique from a second rendering of the immersive environment content being received by a second local area client; and
a local area network interfaced between the VR client and the local area clients configured to use a network control protocol, the network control protocol coupled with multicasting over the local area network and configured to enable a plurality of local area clients to subscribe to the stream from the VR client, and operative to implement multicasting to synchronize distribution of the stream between the VR client and the local area clients;

wherein the local area clients are each rendered capable to display a unique set or subset of the full representation of the stream of immersive environment content from the VR client.

2. The system of claim 1, wherein the network control protocol is selected from the group consisting of: A) Real-time Transport Protocol (RTP), B) Real Time Streaming Protocol (RTSP), and C) Real-Time Messaging Protocol (RTMP).

3. The system of claim 1, one of the local area clients comprises a VR headset.

4. The system of claim 1, wherein the local area network is configured to distribute a Hypertext Transfer Protocol (HTTP) stream.

5. The system of claim 1, wherein the VR client is a hub client and the local area clients are spoke clients, the local area network is configured to distribute an Hypertext Transfer Protocol (HTTP) stream from the hub client to the spoke clients.

6. The system of claim 1, wherein the stream of immersive environment content is selected from the group consisting of A) panoramic video content, B) audio content, and C) meta data.

7. The system of claim 1, wherein the first rendering of the immersive environment content at the first local area client has a uniquely different piece of the stream than the second rendering of the immersive environment content at the second local area client.

8. The system of claim 1, wherein the stream comprises video in a high definition panoramic format, wherein a single stream of content is downloaded from one of: A) an Internet; and B) a content distribution network, and a plurality of unique consumers on the local area network are enabled access to at least some of the single stream of content to each be uniquely immersed in a tailored VR environment, wherein each consumer is enabled to look at and hear a different piece of the single stream of content based on each consumer's personal view in a VR space of the single stream.

9. A system for distributing Virtual Reality (VR) content over a network, comprising:
a content distribution network having a server configured to distribute a digital broadcast of an immersive environment as a VR stream of immersive environment content;
a hub client communicating with the network via a communications link and configured to receive the VR stream of immersive environment content as a full representation of the digital broadcast;
spoke clients communicating with the network via a communications link each configured to receive at least a portion of the VR stream of immersive environment content distributed from the hub client, wherein a first spoke client is receiving at least a portion of the stream of immersive environment content that is unique from at least a portion of the stream of immersive environment content being received by a second spoke client; and
a local area network interfaced between the hub client and the spoke clients configured to implement a network control protocol coupled with multicasting over the local area network and configured to enable a plurality of spoke clients to subscribe to the stream from the hub client, and operative to implement multicasting to synchronize distribution of the stream between the hub client and the spoke clients;
wherein the spoke clients are local area content displaying clients each rendered capable of displaying a unique portion of the stream of immersive environment content from the primary client and the hub client is a VR content recipient and distribution client.

10. The system of claim 9, wherein the stream comprises video in a high definition panoramic format, and wherein a single stream of content is downloaded from one of: A) an Internet; and B) a content distribution network.

11. The system of claim 10, wherein a plurality of unique consumers on the local area network are enabled access to at least some of the single stream of content to each be uniquely immersed in a tailored VR environment, wherein each consumer is enabled to look at and hear a different piece of the single stream of content based on each consumer's personal view in a VR space of the single stream.

12. The system of claim 9, wherein at least one of the local area content displaying clients comprises a virtual reality (VR) headset.

13. The system of claim 9, wherein the stream of immersive environment content includes at least one of a set consisting of: A) panoramic video content, B) audio content, and C) meta data.

14. The system of claim 9, wherein the local area network is configured to distribute a Hypertext Transfer Protocol (HTTP) stream from the hub client to the spoke clients.

15. The system of claim 9, wherein the local area network is configured to implement a network control protocol including one of a set of: A) Real-time Transport Protocol (RTP), B) Real Time Streaming Protocol (RTSP), and C) Real-Time Messaging Protocol (RTMP).

16. A method for dispersing immersive environment content to clients, comprising:
providing a content distribution network having a server, a virtual reality (VR) client, a plurality of local area clients, and a local area network;
distributing a digital broadcast of an immersive environment as a stream of immersive environment content to the central VR client;
at the VR client, synchronizing distribution of the stream by a network control protocol coupled with multicasting over the local area network and configured to enable the plurality of local area clients to subscribe to the stream from the VR client, and operative to implement multicasting to synchronize distribution of the stream between the VR client and the local area clients;
from the local area clients, downloading at least a portion of the stream of immersive environment content from the VR client such that a first local area client is receiving a first at least a portion of the stream of immersive environment content that is unique from a second at least a portion of the stream of immersive environment content being received by a second local area client from the stream;
rendering for display at the first local area client the first at least a portion of the stream from the VR client; and
rendering for display at the second local area client the second at least a portion of the stream from the VR client that is unique from the first at least a portion of the stream being rendered for display at the first local area client.

17. The method of claim 16, wherein, prior to distributing the stream of immersive environment content, recording meta data related to one or more panoramic video feeds and distributing and serving the video feeds as at least a portion of the stream of immersive environment content through the content distribution network to one of the local area clients where viewers can tailor the received stream at a respective local area client into unique, individualized video productions at multiple local area clients on the local area network.

18. The method of claim 16, wherein the stream of immersive environment content includes at least one of a set consisting of: A) panoramic video content, B) audio content, and C) meta data.

19. The method of claim 16, wherein a single connection is established between the VR client and the content distribution network, wherein only the VR client is using bandwidth to acquire the immersive environment content from one of: A) an Internet; and B) a content distribution network.

20. The method of claim 16, wherein the immersive environment content comprises panoramic video content, and rendering for display at the first local area client and the second local area client comprises uniquely different portions of the video stream so as to enable individual viewers at the first local area client and the second local area client to tailor a unique video stream at the respective first local area client and the second local area client into unique, individualized video productions at multiple clients on the local area network.

\* \* \* \* \*